(12) United States Patent
Shikayama et al.

(10) Patent No.: US 7,531,923 B2
(45) Date of Patent: May 12, 2009

(54) CORELESS LINEAR MOTOR

(75) Inventors: Toru Shikayama, Fukuoka (JP); Nobuyuki Irie, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 420 days.

(21) Appl. No.: 10/524,633

(22) PCT Filed: Aug. 11, 2003

(86) PCT No.: PCT/JP03/10234

§ 371 (c)(1),
(2), (4) Date: Mar. 17, 2006

(87) PCT Pub. No.: WO2004/019470

PCT Pub. Date: Mar. 4, 2004

(65) Prior Publication Data

US 2006/0175907 A1    Aug. 10, 2006

(30) Foreign Application Priority Data

Aug. 20, 2002   (JP) .............................. 2002-239618

(51) Int. Cl.
*H02K 41/02*   (2006.01)
(52) U.S. Cl. ...................................... 310/12
(58) Field of Classification Search ............. 310/12–15
See application file for complete search history.

(56) References Cited

U.S. PATENT DOCUMENTS

| | | | |
|---|---|---|---|
| 4,151,447 A | 4/1979 | von der Heide et al. | |
| 6,064,128 A * | 5/2000 | Yagoto et al. | 310/12 |
| 6,407,471 B1 * | 6/2002 | Miyamoto et al. | 310/12 |
| 6,731,029 B2 * | 5/2004 | Shikayama et al. | 310/58 |
| 6,800,968 B1 * | 10/2004 | Shikayama et al. | 310/12 |
| 6,831,379 B2 * | 12/2004 | Ohto et al. | 310/12 |
| 6,946,755 B2 * | 9/2005 | Tamai et al. | 310/12 |
| 7,242,117 B2 * | 7/2007 | Sugita et al. | 310/12 |
| 2003/0098620 A1 * | 5/2003 | Ohto et al. | 310/12 |

(Continued)

FOREIGN PATENT DOCUMENTS

| | | |
|---|---|---|
| GB | 2233835 A | 1/1991 |
| JP | 6-165474 A | 6/1994 |
| JP | 7-322595 A | 12/1995 |
| JP | 2001-78420 A | 3/2001 |
| JP | 2002051530 A | 2/2002 |
| JP | 2002-165434 A | 6/2002 |

*Primary Examiner*—James Harvey
(74) *Attorney, Agent, or Firm*—Sughrue Mion, PLLC

(57) ABSTRACT

An object of the invention is to provide a coreless linear motor which can suppress the increase in the temperature of an armature winding.

There is provided a coreless linear motor in which a slider (10) is made up of an armature winding (11) which comprises a plurality of coils (13) and a slider mounting table (12) which supports the armature winding (11), and a stator (1) is made up of permanent magnets (2) which form a plurality of magnetic poles and back yokes 3, and, furthermore, in which both left and right sides of the armature winding (11) is sandwiched by the permanent magnets (2) via a gap, the coreless linear motor being characterized in that a concave portion (12a) is provided in a lower side of the slider mounting table (12), and in that a coil upper side (14) which corresponds to an upper side of the coil (13) is inserted in the interior of the concave portion (12a) in the slider mounting table (12) and a space is provided in the vicinity of a coil lower side (15) which corresponds to a lower side of the coil (13) for performing a connecting process between the coils (13) or the coil (13) and a lead wire (16).

4 Claims, 3 Drawing Sheets

U.S. PATENT DOCUMENTS

2004/0032170 A1* 2/2004 Tamai et al. .................. 310/13
2006/0108879 A1* 5/2006 Sugita et al. .................. 310/12
2006/0175907 A1* 8/2006 Shikayama et al. ........... 310/12
2007/0152513 A1* 7/2007 Shikayama et al. ........... 310/12

* cited by examiner

CORELESS LINEAR MOTOR

TECHNICAL FIELD

The present invention relates to a coreless linear motor for use in constant-speed feeding or highly accurate positioning which requires thrust ripple and low heat generation.

BACKGROUND ART

As conventional coreless linear motors in which coils of concentrated winding are disposed without being superimposed on one another, there are such coreless linear motors which are disclosed in JP-A-7-322595, JP-A-6-165474 and U.S. Pat. No. 4,151,447. These coreless linear motors, which are so disclosed, are advantageous in that there is generated no cogging force due to them being coreless, that is, the velocity ripple is small. In addition, it can be raised as an advantage of those coreless linear motors that they have high insulation properties due to the coils of concentrated winding being disposed without being superimposed on one another.

A conventional coreless linear motor is shown in FIGS. 4 and 5. FIG. 4 is a perspective view which shows only a slider and a stator of a coreless linear motor of the related art. FIG. 5 is a cross-sectional view as seen in a traveling direction of the slider.

The stator 1 is made up of permanent magnets 2 which form a plurality of magnetic poles, back yokes 3 to which the plurality of permanent magnets are affixed and a yoke supporting table 4 which fixedly support the two back yokes 3 which are disposed on both left and right sides thereof along one side thereof. The permanent magnets 2 are disposed at a pitch of λ such that the polarities of the permanent magnets 2 which face each other inwardly of the two back yokes 3 and the polarities of the permanent magnets 2 which are adjacent to each other in the traveling direction of the slider becomes different.

The slider 10 is made up of an armature winding 11 and a slider mounting table 12 having a concave cross section in which the armature winding 11 is fixed. Since it is mounted on a table or the like which constitutes a load, the slider mounting table 12 is made of a metallic material such as aluminum which ensures a strength. The armature winding 11 is disposed in such a manner as to provide a predetermined gap between the permanent magnets 2 disposed on the interior side of each of the two back yokes 3 and itself. In addition, the armature winding 11 is made up of a plurality of coils 13. Here, a coil end portion which corresponds to an upper side of the coil 13 is referred to as a coil upper side 14 and a coil end portion which corresponds to a lower side of the coil 13 is referred to as a coil lower side 15. The coils 13 are connected to each other via the coil upper sides 14 and distal ends of the coils 13 are connected with lead wires 16. In addition, a space for connecting the coils 13 to each other and a space for the lead wires 16 are provided in the concavity of the slider mounting table 12. Eventually, the armature winding 11 and the interior of the concavity of the slider mounting table 12 are covered with a molded resin 17, so that the armature winding 11 and the slider mounting table 12 cooperate together to make up the slider 10.

In the stator and the slider which are constructed as has been described heretofore, the slider is made to freely move in the traveling directions thereof by a supporting mechanism such as a linear guide, not shown.

Incidentally, the related art has the following problem.

When current required for generation of a predetermined thrust is applied to the armature winding 11, Joule heat is generated in the coils 13 in proportion to the square of the current applied. The heat generated in the coils 13 is divided into a portion which is emitted from the surfaces of the molded resin 17 which face the gaps and a portion which is conducted to the slider mounting table 12. While the thermal distribution rate of the heat so generated differs depending upon the material and size of the load table on which the slider mounting table 12 is mounted and the state in which the slider mounting table 12 is mounted on the load table, the portion of the heat which is conducted to the slider mounting table 12, which is made of metal and hence which conducts heat better, is greater than the other portion. In contrast, in the event that the slider mounting table 12 has a construction which makes the heat conduction difficult, the increase in the temperature of the coils 13 becomes extremely large According to the related art, the molded resin 17 is filled in the wide concavity provided between the slider mounting table 12 and the coils 13 for the purpose of connecting process. Namely, the molded resin 17 constitutes a large thermal resistance, which disturbs the conduction of heat to the slider mounting table 12, and due to this, the increase in the temperature of the coils 13 became extremely large. While epoxy resin (having a heat conductivity of 1.5 W/mK), which conducts heat well and contains, for example, alumina, has been used for the molded resin 17 with a view to preventing such a heat increase as much as possible, no sufficient effect has been obtained.

Disclosure of the Invention

The invention is made with a view to solving the problem, and an object thereof is to provide a coreless linear motor which can suppress the increase in the temperature of an armature winding.

With a view to solving the problem, according to a first aspect of the invention, there is provided a coreless linear motor in which a slider is made up of an armature winding which comprises a plurality of coils and a slider mounting table which supports the armature winding and a stator is made up of permanent magnets which form a plurality of magnetic poles and back yokes, and, furthermore, in which both left and right sides of the armature winding is sandwiched by the permanent magnets via a gap, the coreless linear motor being characterized in that a concave portion is provided in a lower side of the slider mounting table, and in that a coil upper side which corresponds to an upper side of the coil is inserted in the interior of the concave portion in the slider mounting table and a space is provided in the vicinity of a coil lower side which corresponds to a lower side of the coil for performing a connecting process between the coils or the coil and a lead wire.

According to a second aspect of the invention, a space for performing a connecting process is provided directly below the coil lower side.

According to a third aspect of the invention, a space for performing a connecting process is provided on both left and right sides of the coil lower side.

According to a fourth aspect of the invention, a cooling passageway is provided in the slider mounting table for the passage of a refrigerant or air.

As has been described above, according to the invention, there are provided the following advantages.

(1) Due to the thermal resistance between the coils and the slider mounting table becoming extremely small, the increase in the temperature of the coils can be suppressed (the first aspect of the invention).

(2) Due to the provision of the new space for a connecting process, the same advantage as that obtained by the first aspect of the invention can be obtained (the second aspect of the invention).

(3) Due to the provision of the space for a connecting process on both the left and right sides of the coil end portion, the same advantage as that obtained by the first aspect of the invention can be obtained, and an advantage that the height of the slider can be reduced further can also be obtained over the second aspect of the invention (the third aspect of the invention).

(4) Due to the provision of the cooling passageway in the slider mounting table to which much heat is conducted, the advantages of the fist to third aspects of the invention can be enhanced further (the fourth aspect of the invention).

BRIEF DESCRIPTION OF THE DRAWINGS

FIG. 1 shows a coreless linear motor according to a first embodiment of the invention, in which

BEST MODE FOR CARRYING OUT THE INVENTION

Embodiments of the invention will be described below based on the drawings.

Figure 4:
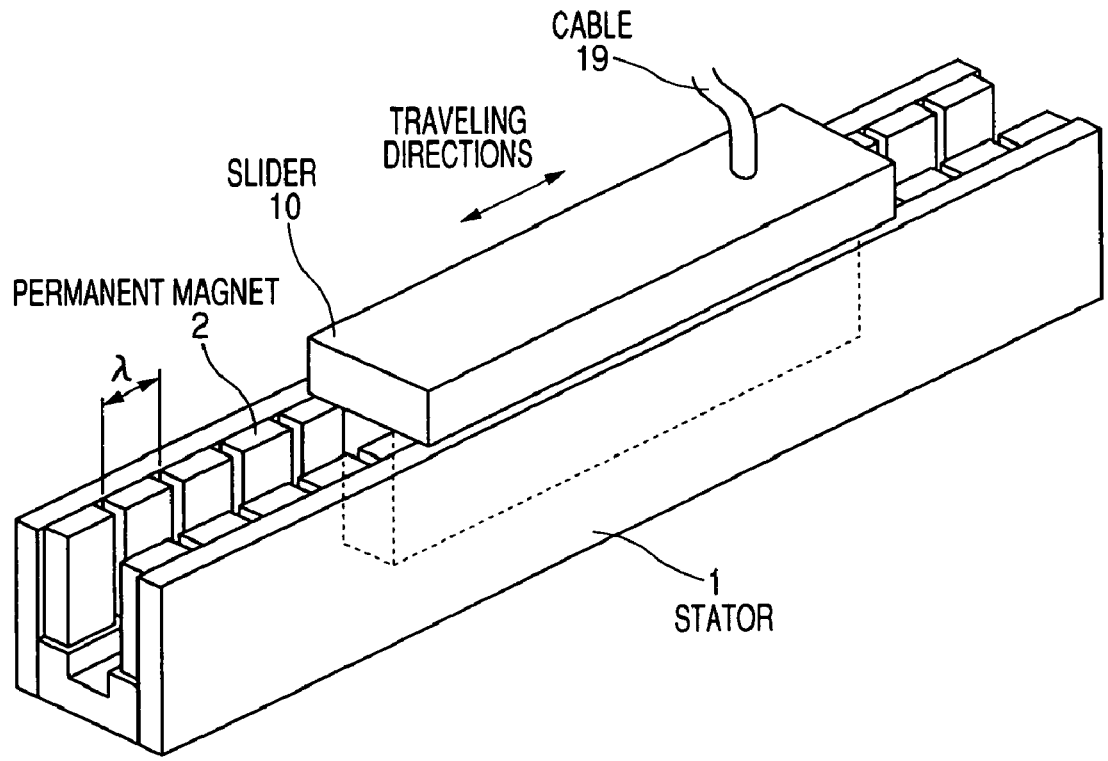
FIG. 4 is a perspective view of a coreless linear motor according to the related art.
Figure 5:
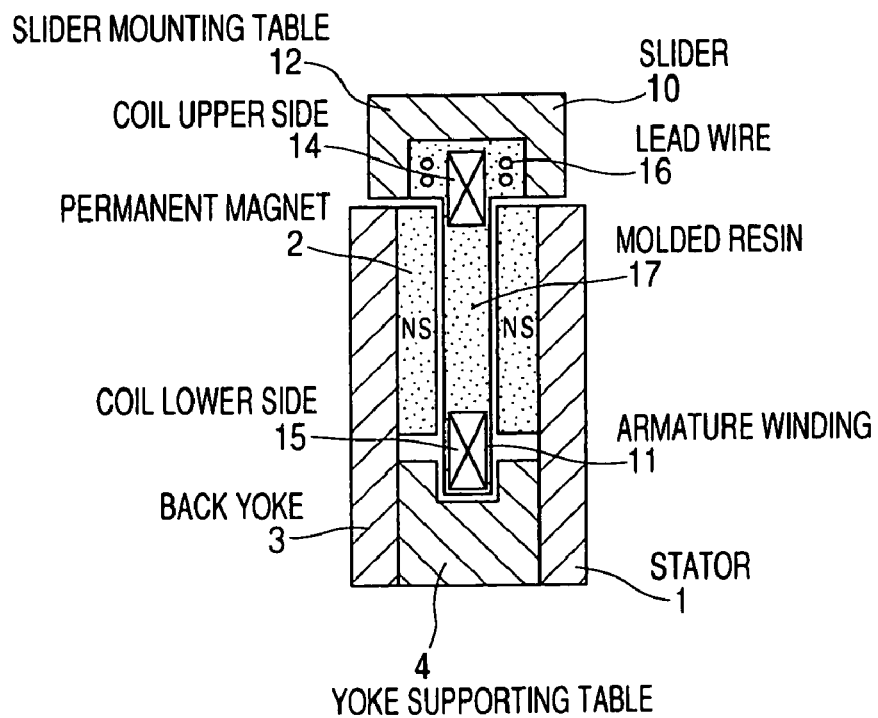
FIG. 5 is a corresponding view to FIG. 1A which shows the coreless linear motor according to the related art.

The invention is similar to the construction shown in FIGS. 4, 5 except for the construction of a slider thereof. Consequently, the description of a stator will be omitted.

First Embodiment

Figure 1A:
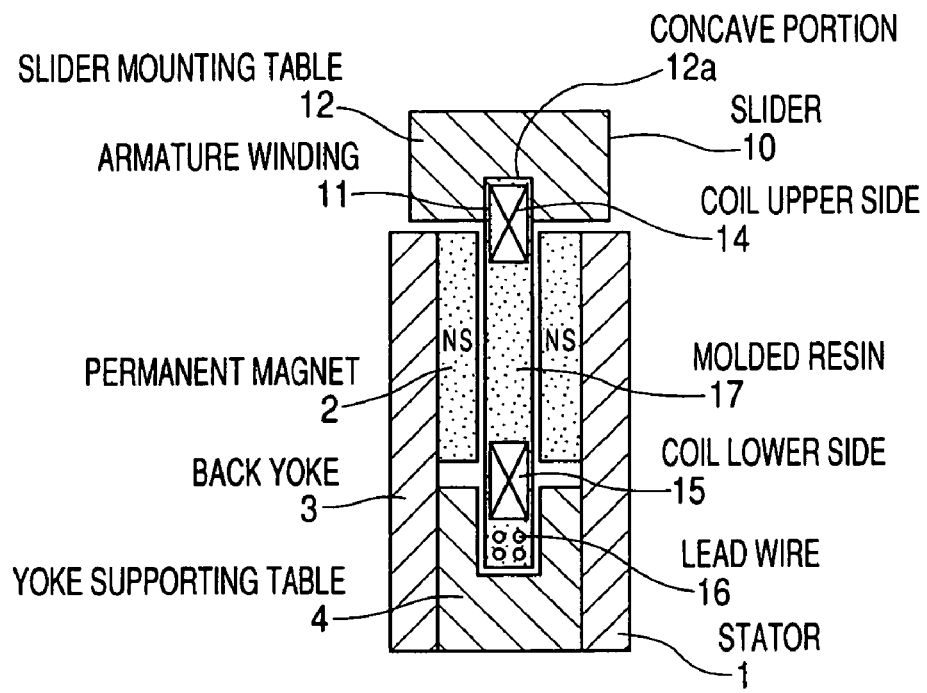
FIG. 1A is a cross-sectional view of the coreless linear motor as seen in a traveling direction thereof.
Figure 1B:
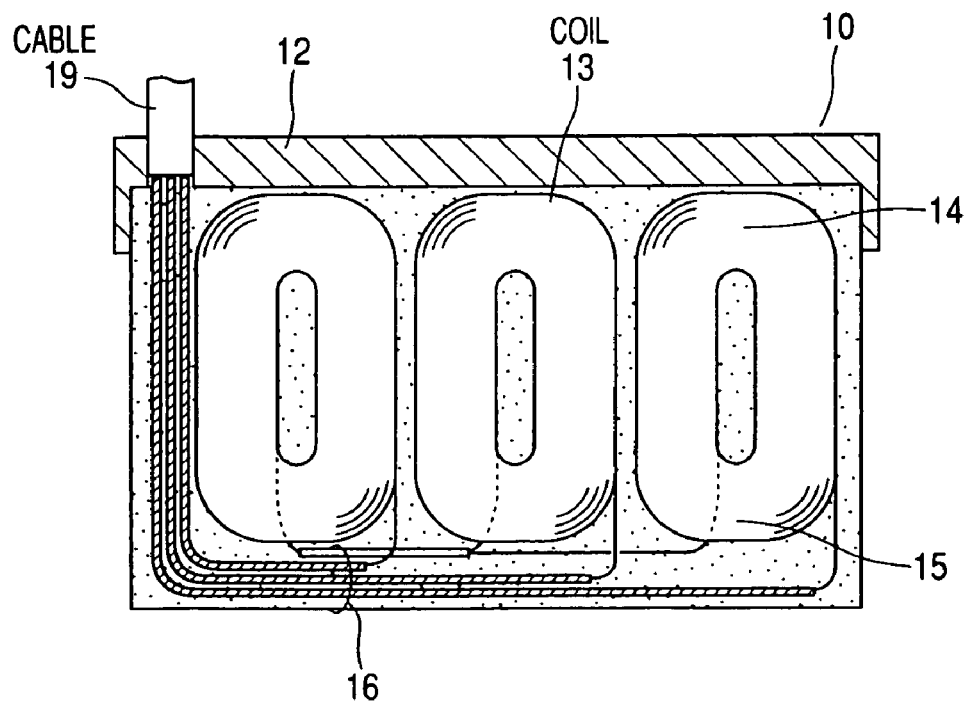
FIG. 1B is a sectional view of a slider as seen from the side thereof.

FIGS. 1A, 1B are drawings showing a first embodiment, in which FIG. 1A is a cross-sectional view as seen in a traveling direction of a slider, and FIG. 1B is a sectional view of the slider as seen from the side thereof.

Similar to that of the related art, the slider 10 in the first embodiment is made up of an armature winding 11 including a plurality of coils 13, a slider mounting table 12 in which the armature winding 11 is fixedly supported, lead wires 16 and a molded resin 17 which covers the armature winding 11 and the whole of the lead wires 16. Here, taking three phases for example, the slider is shown as being made up of three coils of concentrated winding, which constitutes a minimum number of coils required. A space is provided directly below coil lower sides 15 of the three coils for performing the connection between the coils 13 or of the coils 13 with the lead wires 16. The lead wires 16 are passed below the coil lower sides 15 and are then pulled up around the coil lower side 15 to be led to the slider mounting table 12 at the front of the slider 10. Since it is mounted on a table which constitutes a load, the slider mounting table 12 is made of a metallic material such as aluminum which can ensure a strength. In addition, the slider mounting table 12 is formed so as to have a concave cross-sectional shape, and coil upper sides 14 of the coils 13 are inserted into a concave portion so formed in the slider mounting table 12. The concave portion in the slider mounting table 12 is machined so as to have a channel which matches portions of the coil upper sides 14 which are inserted thereinto.

By adopting the construction, the coil upper sides 14 can be made to approach the slider mounting table 12. Namely, the thermal resistance therebetween is made to become extremely small, so that heat generated in the coils 13 can easily escape to the slider mounting table 12. As a result, the increase in the temperature of the coils 13 can be suppressed largely.

Second Embodiment

Next, a second embodiment of the invention will be described.

Figure 2:
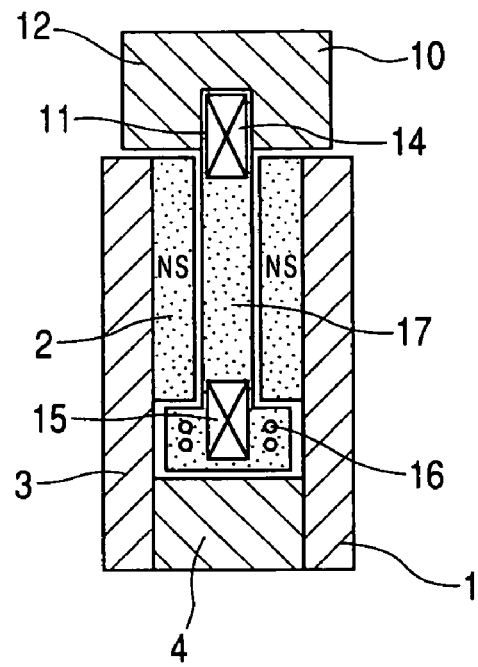
FIG. 2 is a corresponding view to FIG. 1A which shows a coreless linear motor according to a second embodiment of the invention.

The second embodiment is such as to related to the third aspect of the invention. FIG. 2 shows a cross section as seen in the traveling direction of a slider. The second embodiment differs from the first embodiment in that the space for a connecting process is provided on the left and right sides of the coil lower sides 15. As a result, the cross section of a slider 10 becomes an I-shape.

By adopting the construction, similar to the first embodiment, the increase in the temperature of the coils 13 can be suppressed largely. A further advantage of the second embodiment is that since the spaces for a connecting process are positioned directly below the permanent magnets 2, the dimension of the slider in the height direction can be reduced.

Third Embodiment

Next, a third embodiment of the invention will be described.

Figure 3:
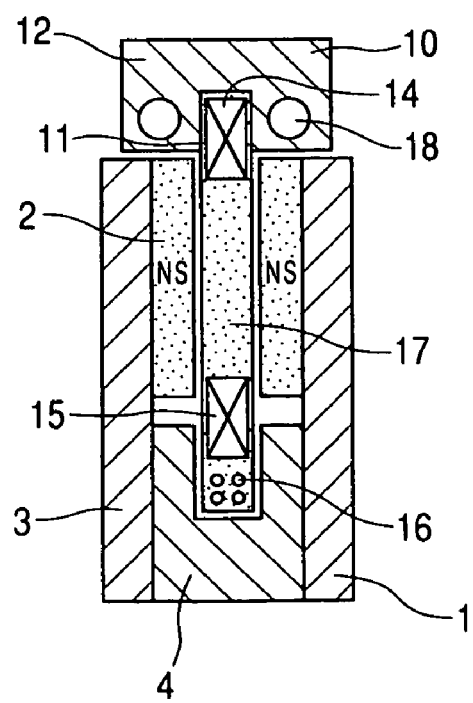
FIG. 3 is a corresponding view to FIG. 1A which shows a coreless linear motor according to a third embodiment of the invention.

The third embodiment is such as to relate to the fourth aspect of the invention. FIG. 3 is a cross section as seen in a traveling direction of a slider. The third embodiment differs from the first or third embodiment in that a refrigerant passageway 18 is provided in a slider mounting table 12 for the passage of a refrigerant or air.

By adopting the construction, since the slider mounting table 12 through which much heat passes can be cooled directly, the suppression of the increase in the temperature of the coils 13, which is the advantage obtained by the first and second embodiments, can be enhanced further.

INDUSTRIAL APPLICABILITY

The invention can be applied to a technical field which produces and provides a coreless linear motor for use in constant-speed feeding or highly accurate positioning which requires thrust ripple and low heat generation.

The invention claimed is:

1. A coreless linear motor comprising:
    a slider which is made up of an armature winding which includes a plurality of coils and a slider mounting table which supports the armature winding, and
    a stator which is made up of permanent magnets which form a plurality of magnetic poles and back yokes, wherein
    both left and right sides of the armature winding is sandwiched by the permanent magnets via a gap,
    a concave portion is provided in a lower side of the slider mounting table,
    a coil upper side which corresponds to an upper side of the plurality of coils is inserted in the interior of the concave portion in the slider mounting table, and
    a space is provided in the vicinity of a coil lower side which corresponds to a lower side of the plurality of coils for performing a connecting process between the plurality of coils or the plurality of coils and a lead wire.

2. The coreless linear motor as set forth in claim 1, wherein a space for performing a connecting process is provided directly below the coil lower side.

3. The coreless linear motor as set forth in claim 1, wherein a space for performing a connecting process is provided on both left and right sides of the coil lower side.

4. The coreless linear motor as set forth in any of claims 1 to 3, further comprising: a cooling passageway provided in the slider mounting table for the passage of a refrigerant or air.

* * * * *